United States Patent

Shreve et al.

[11] Patent Number: 5,973,266
[45] Date of Patent: Oct. 26, 1999

[54] METHOD FOR ALTERING CABLE SEMICONDUCTIVE LAYER

[75] Inventors: Gary A. Shreve; Nanayakkara Liyanage Don Somasiri; Justine Anne Mooney; Alan George Hulme-Lowe; Curtis Roy Guilbert, all of Austin, Tex.

[73] Assignee: 3M Innovative Properties Company, Saint Paul, Minn.

[21] Appl. No.: 09/046,897

[22] Filed: Mar. 24, 1998

Related U.S. Application Data

[62] Division of application No. 08/690,958, Aug. 1, 1996, Pat. No. 5,770,257.

[51] Int. Cl.$^6$ ................................................. H02G 15/02
[52] U.S. Cl. ............................ 174/74 R; 174/105 SC
[58] Field of Search .................... 174/105 SC, 73.1, 174/106 SC, 102 SC, 120 SC, 74 R

[56] References Cited

U.S. PATENT DOCUMENTS

| | | | |
|---|---|---|---|
| 3,644,662 | 2/1972 | Salahshourian | 174/73.1 X |
| 4,029,830 | 6/1977 | Yamamoto et al. | 174/105 SC X |
| 4,626,618 | 12/1986 | Takaoka et al. | 174/105 SC |

*Primary Examiner*—Dean A. Reichard
*Assistant Examiner*—Chau N. Nguyen
*Attorney, Agent, or Firm*—Matthew B. McNutt

[57] ABSTRACT

A method of altering a portion of the semiconductive layer of an electric power cable, to increase its resistance so as to render it electrically insulative. The semiconductive layer is loaded with carbon powder which forms chains to provide conductive pathways through the layer. By introducing an intercalant into the semiconductive layer, which causes the layer to swell, the conductive pathways are interrupted and the material is rendered insulative ($>10^4$ $\Omega$-cm). The intercalant may be a polymerizable material with a curing agent which is cured in situ, i.e., without removing the semiconductive layer from the cable. By this method, flashover to the semiconductive layer at a cable splice or termination may be prevented without requiring tedious removal of the exposed portion of the semiconductive layer. The method is usable with both strippable and coextruded semiconductive layers.

5 Claims, 1 Drawing Sheet

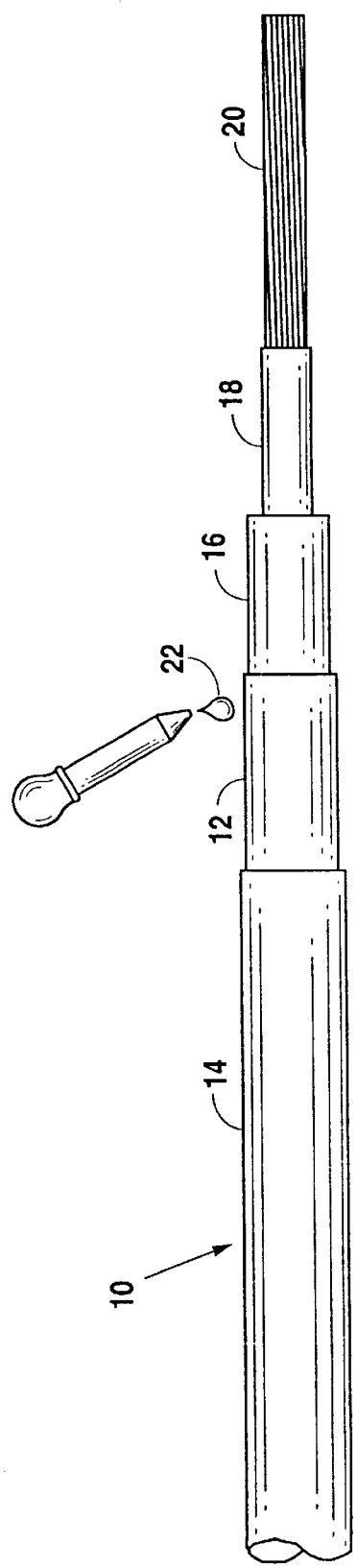

METHOD FOR ALTERING CABLE SEMICONDUCTIVE LAYER

This is division of application No. 08/690,958 filed Aug. 1, 1996, now U.S. Pat. No. 5,770, 257.

BACKGROUND OF THE INVENTION

1. Field of the Invention

The present invention generally relates to fabrication or modification of insulating layers for electrical cables, and more particularly to a method of altering a portion of a cable's semiconductive layer to render it electrically insulative.

2. Description of the Prior Art

A high percentage of high voltage cable installed today is polymeric-based, with a central metal conductor surrounded by a layer of carbon-loaded polymer (a semiconductive layer), further surrounded by a dielectric layer which is also a polymer, and another, outer layer of semiconductive material, for electric field containment. The semiconductive layer is typically made by loading a polymer, such as low density polyethylene, with a large amount of carbon powder (e.g., 30–50% by volume). This high loading of carbon forms chains of overlapping particles to allow conduction through the polymer matrix. There is a dramatic increase in conductivity within a narrow range (usually within about 5 vol. %) in which these conductive chains are established. The volume percent where this increase in conductivity occurs (the percolation threshold) is very dependent on the size and aspect ratio of the conductive particles.

Present technology in cable splicing and terminations for, e.g., 5 kV–25 kV cables typically involves the manual removal of 3 to 6 inches of length of the outer semiconductive layer from the cable end. This step further isolates the center conductor from the grounded semicon so that current does not flashover and destroy the splice or termination. The removal operation requires considerable craft and training to properly accomplish. Scratches or a slightly lifted edge of the semiconductive layer resulting from cable preparation leave air gaps which will breakdown in the high electric field of the energized cable, forming a reactive plasma which degrades the polymer insulation, leading to cable failure, often violent.

There are two major types of electric cables with differing semiconductive layers, strippable or coextruded. The majority of cable in the United States is strippable to allow quicker removal of the layer for splicing or terminating. Although coextruded semicon has better overall electrical characteristics, it is used less because it requires much more extensive work to properly remove the semicon to make a splice or termination. The removal of the semicon has been identified as the largest factor in splice/termination failures. It would, therefore, be desirable to devise a method of preventing flashover to the semiconductive layer at a splice or termination without requiring tedious removal of a portion of the semiconductive layer, and it would be particularly advantageous if the technique were usable with both strippable and coextruded semiconductive layers.

SUMMARY OF THE INVENTION

The present invention provides a method of preparing the end of an electrical cable having an outer jacket, a semiconductive layer formed of a polymer having chains of conductive material therein forming conductive pathways, and a central conductor, by removing a portion of the jacket to expose a portion of the semiconductive layer, and treating the exposed portion of the semiconductive layer with an intercalant to interrupt the conductive pathways sufficiently to render the treated, exposed portion more electrically resistive. In this method, the electrical conductivity of the exposed portion of the semiconductive layer portion is altered by applying a polymerizable material for a sufficient time to allow the semiconductive layer to absorb some of the polymerizable material such that it swells. The polymerizable material is then cured within the exposed portion of the semiconductive layer in a state of increased volume such that the effective loading of the conductive material in the polymer is decreased. The method imparts a resistance of greater than $10^4$ Ω-cm to the exposed portion of semicon, and the resistance may reach as high as $10^7$–$10^9$ Ω-cm. The intercalant may include a curative agent with the polymerizable material which is also absorbed into the exposed portion of the semiconductive layer, and the polymerizable material is cured by heating the polymerizable material and curative agent in situ, i.e., without removing the semiconductive layer from the cable. The intercalant may be dissolved in a solvent such as toluene, or may be applied in a solventless process. The polymerizable material is preferably applied substantially completely along the exposed portion of the semiconductive layer in order to ensure a substantially uniform decrease in the capacitance and increase in the resistance of the exposed portion of the semiconductive layer, to avoid catastrophic failure due to polymer breakdown. Depending upon the temperatures used to cure, the exposed portion of the semiconductive layer may reach a resistance greater than $10^4$ Ω-cm within twenty minutes or less of heating.

The cable end, once so prepared, is suitable for installation in a splice or termination, without the need to remove the semiconductive layer. The polymerizable material is preferably a monomer, such as p-tert-butylstyrene and/or isobornyl methacrylate, with a vulcanizing agent such as dicumyl peroxide.

BRIEF DESCRIPTION OF THE DRAWINGS

The invention will best be understood by reference to the accompanying drawings, wherein FIG. 1 is a side elevational view of an electrical cable whose outermost jacket has been removed to reveal a portion of a semiconductive layer, and treatment of that layer with an intercalant to alter its electrical conductivity.

DESCRIPTION OF THE PREFERRED EMBODIMENT

With reference now to FIG. 1, there is depicted an electric cable 10, such as a conventional high voltage power cable, having an outer semiconductive layer 12, a portion of which is to be treated according to the present invention to convert it to an electrically insulative portion. Cable 10 also has an outermost jacket 14, a portion of which has been removed in FIG. 1 to reveal the other interior layers, which include a dielectric layer 16, an inner semiconductive layer 18, and a central current-carrying conductor 20. In a typical power cable, jacket 14 is formed of a polymer such as polyvinyl chloride, outer and inner semiconductive layers 12 and 18 are formed of a polymer filled with a conductive material, such as carbon-loaded polyethylene, dielectric layer 16 is formed of another polymer, such as cross-linked polyethylene (XLPE), and central conductor 20 is formed of stranded copper or aluminum. Coextruded cable has a similar construction.

When cable 10 is to be spliced to another cable, or terminated at a connection, prior art techniques would require removal of a portion of outer semiconductive layer 12 near the end of cable 10 in order to avoid flashover, but in the present invention this portion is not removed; instead, it is altered into an insulative material so that removal is not required. Outer semiconductive layer 12 is treated by applying a penetrant or intercalant 22 which disrupts the current-carrying capacity provided by the conductive filler in the polymer matrix forming the semiconductive layer. This increase in resistance is sufficient to allow the treated semiconductive layer to remain as part of the termination or splice, thus reducing the labor required to make the prepared cable end, and eliminating the possibility of damage resulting from removal of the semiconductive layer.

The interruption of the carbon chains in the end portion of outer semiconductive layer 12 is accomplished by increasing the effective volume of the material, i.e., by swelling. Although many materials may be used to cause layer 12 to swell, it is preferable to use a polymerizable material which may be absorbed by layer 12 and then polymerized in situ. For example, a room temperature epoxy formulation was prepared by dissolving 10 g of epoxy monomer (Heloxy 107 from Shell) and 2.2 g of amine curative (Epi-Cure 3271 from Shell) in 50 g of toluene. Semiconductive samples of carbon-loaded polyethylene having an average thickness of about 50 mil (1.3 mm) were immersed in this solution for 15, 30, 60 and 120 minutes. The swelled material so obtained was dried in a vacuum oven at 100–110° C. for two hours to drive off toluene. Two-probe resistance measurements (1.5" (3.8 cm) separation using Fluke 8012A digital multimeter) of the semiconductive material prior to epoxy growth was 5 to 10 k$\Omega$ depending on the pressure applied to the probes. The samples immersed 30 minutes or less were not insulating, i.e., their resistance was below $10^5$ $\Omega$. The immediate resistance of the samples immersed for 60 minutes and above increased to over 20 M$\Omega$ These high resistance values remained unchanged after two hours drying at 100–11° C. in a vacuum oven. Two pins at 1.5" (3.8 cm) distance were pushed through these two samples and a resistance meter was connected to the pins to measure bulk resistance, i.e., through the thickness of the semiconductive samples. The measured resistance was still over 20 M$\Omega$. The resistance of the 60 minute and 120 minute samples was also measured using an HP-4329A high resistance meter at 120V applied between the two probes, and was between $10^7$ and $10^9$ $\Omega$. These high resistance values remain unchanged even after four months. These data suggest that epoxy monomers and curatives, diffused throughout the entire semiconductive material, grow within the material. As a result, the conductive pathways between carbon particles were interrupted and the entire treated portion of semiconductive material became insulating.

In another epoxy formulation, 15.5 g of the same epoxy monomer and 9.2 g of another amine curative (Epi-Cure 3277 from Shell) were dissolved in 50 g of toluene. Semiconductive samples 25 mil (0.64 mm) thick were immersed in this solution for up to 2 hours at room temperature, to allow the monomers and curatives to diffuse into the bulk of the material. The swelled material so obtained was dried in a vacuum oven at 100–110° C. for 30 minutes to drive off toluene. Two-probe resistance was measured, as described above, between $10^7$ and $10^8$ $\Omega$.

The first experiment above was repeated by adding different commercially available types of surfactants such as Triton (from Aldrich) or Emcol CC-36 (from Witco). The surfactant level was increased from 6 to 30% by weight. At 30% level with Emcol CC-36, the epoxy formulation containing the curative Epi-Cure 3271 turned into a more clear solution. No solution precipitation was noticed for at least one day. In the repeat of the first described experiment above, the resistance of the 60 and 120 minute samples was again in the $10^7$ and $10^9$ $\Omega$ range.

As control experiments, semiconductive samples as above were treated in toluene containing up to 30% (by weight) surfactants. The types of surfactants used were Triton, Emcol CC-36, and Aerosol C-61 (cationic, from Cytec). After two hours of absorbing the solution, the samples were removed and the resistance was measured as described above. The resistance of the swelled semiconductive sample immediately after removal from the solution was over 20 M$\Omega$. However, after drying at 100–110° C. for as little as 30 minutes, the resistance decreased by several orders of magnitude reaching values between 5 to 20 k$\Omega$. These data suggest that surfactant itself does not appear to interrupt the conductive paths between carbon particles under these experimental conditions. It was also noticed that the swelled semicon obtained by using the Emcol CC-36 formulation (before removing toluene) became very brittle and easy to break into pieces.

This treatment can also be accomplished in a solventless process. For example, a 0.75" (1.9 cm) long piece of 5 kV cable with 20 mil (0.51 mm) semicon as its outermost layer was contacted with two constant force clips leaving a separation of about 4 mm between them. Jumper cables were attached to the clips and the impedance of the semicon was measured with an EG&G model 273 potentiostat and a Solartron 1255 frequency response analyzer giving an impedance at 63 Hz of 3000 $\Omega$-cm. The sample was then immersed in a solution of Aldrich paraffin wax (melting point 65° C.) containing about 10% (by weight) dicumyl peroxide at about 70° C. The sample and solution were then placed in an oven at 180° C. for 1 hour, and removed and allowed to cool to room temperature. Subsequent measurement of the impedance showed it to be 1.5×$10^8$ $\Omega$-cm at 63 Hz, demonstrating the large increase in impedance that is possible to achieve using the present invention. This impedance was stable even after aging in a 70° C. oven for more than 12 hours, indicating that the wax was not free to diffuse back out of the semicon.

A wide variety of polymerizable materials may be used to achieve the increase in volume. Preferred materials include p-tert-butylstyrene (TS) and/or isobornyl methacrylate (IBMA) monomers with dicumyl peroxide or Lupersol 130 (an organic peroxide) as the vulcanizing agent, and 1–2% of Sartomer 454 resin (a trifunctional acrylate) to improve polymerization. Resistance changes in the semicon have also been correlated with the solubility of the solvents in the semiconductive material. With polyethylene, decreasing polarity and hydrogen bonding capability increase the amount and rate of swelling and thus increase the resistance of the semicon. For example, toluene and heptane are superior in this regard, with isopropanol and 1-propanol being less desirable, and acetonitrile and methyl methacrylate (MMA) being generally inadequate.

The amount of time required for immersion in or application of the intercalant may be determined empirically for a particular cable semicon by monitoring impedance and resistance as swelling progresses. For example, impedance spectroscopy (IS) may be used and the IS response modeled to a Randles circuit to obtain effective parallel capacitance and resistance values for the semicon. Parallel resistance can then be plotted vs. time to obtain a reaction rate constant. Data were collected from 80° C. to 130° C. for both TS and IBMA. Arrhenius plots allowed determination of apparent activation energies for the resistance change, found to be about 10.3 kcal/mol for TS and 7.8 kcal/mol for IBMA. The isothermal temperatures of table 1 for particular swell times were calculated from those fits, and represent the temperature required for complete conversion of the semicon (impedance>$10^{10}$ Ω-cm). Swelling for less time might still render the semicon substantially insulative.

TABLE 1

| Swell Time (minutes) | Temperature IBMA (° C.) | Temperature TS (° C.) |
|---|---|---|
| 20 | 164 | 114 |
| 15 | 179 | 122 |
| 10 | 201 | 135 |
| 5 | 245 | 159 |

Even though the activation energy is larger for TS, the large difference in the pre-exponential factor allows TS to swell more quickly in this temperature range. These results indicate that a target treatment time of about 10 minutes per cable is feasible.

Peroxide has been investigated as a curing agent in the method of the present invention. Initial experiments with 1% by weight dicumyl peroxide in TS indicated a decrease in resistance, possibly due to premature crosslinking of the semicon by residual peroxide decomposition catalyst left over from cable manufacture. When the peroxide concentration was reduced by a factor a ten, better results were obtained. With 0.1% by weight peroxide vs. pure monomer in IBMA at 105° C., resistance was slightly higher than without peroxide. Higher amounts of dicumyl peroxide (1%) can still be used if an inhibitor such as Irgonox 2435 (a hindered phenol) is added.

It is important that the semicon be treated evenly and sufficiently along the entire portion of the terminal end of the cable, i.e., that the swelling is substantially complete along the exposed length of semicon. One cable treated according to the present invention failed destructively at 17 kV, apparently due to incomplete treatment due to the semicon touching the side of the container during treatment, which did not allow complete swelling and thus increase in resistance.

Generally, the preferred requirements for the intercalant are that (i) the monomer increase the semicon resistance in an appropriate time frame, (ii) the crosslinking agent is soluble in the semicon matrix for good temperature stability, (iii) the formed polymer is good quality with no voiding in cured material, and (iv) it react favorably with the semicon in terms of curing the polymer. The semicon has been extruded, crosslinked and has residual catalysts/co-agents that can prematurely catalyze the polymer reactions.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

We claim:

1. A cable having an end prepared for a splice or termination, the cable having an outer jacket, a central conductor, and a semiconductive layer interposed between the outer jacket and central conductor, a portion of the jacket being removed to expose a portion of the semiconductive layer, the improvement comprising:

a polymerizable material being absorbed and cured in the exposed portion of the semiconductive layer to increase the volume thereof, thereby causing the resistance of the exposed portion of the semiconductive layer to be at least $10^4$ Ω-cm.

2. The cable of claim 1 wherein said polymerizable material is a monomer.

3. The cable of claim 1 wherein said polymerizable material is applied substantially completely along the exposed portion of the semiconductive layer to uniformly increase the resistance of the exposed portion of the semiconductive layer.

4. The cable of claim 1 wherein dicumyl peroxide is absorbed with said polymerizable material as a vulcanizing agent.

5. The cable of claim 2 wherein said monomer is selected from the group consisting of p-tert-butylstyrene and isobornyl methacrylate.

* * * * *